L. G. COPEMAN.
REFRIGERATING APPARATUS.
APPLICATION FILED JULY 18, 1921.

1,430,153.

Patented Sept. 26, 1922.
3 SHEETS—SHEET 1.

INVENTOR.
Lloyd G. Copeman
BY Stuart C. Barnes
ATTORNEY.

L. G. COPEMAN.
REFRIGERATING APPARATUS.
APPLICATION FILED JULY 18, 1921.

1,430,153.

Patented Sept. 26, 1922.
3 SHEETS—SHEET 2.

INVENTOR.
Lloyd G. Copeman
BY
Stuart C. Barnes
ATTORNEY.

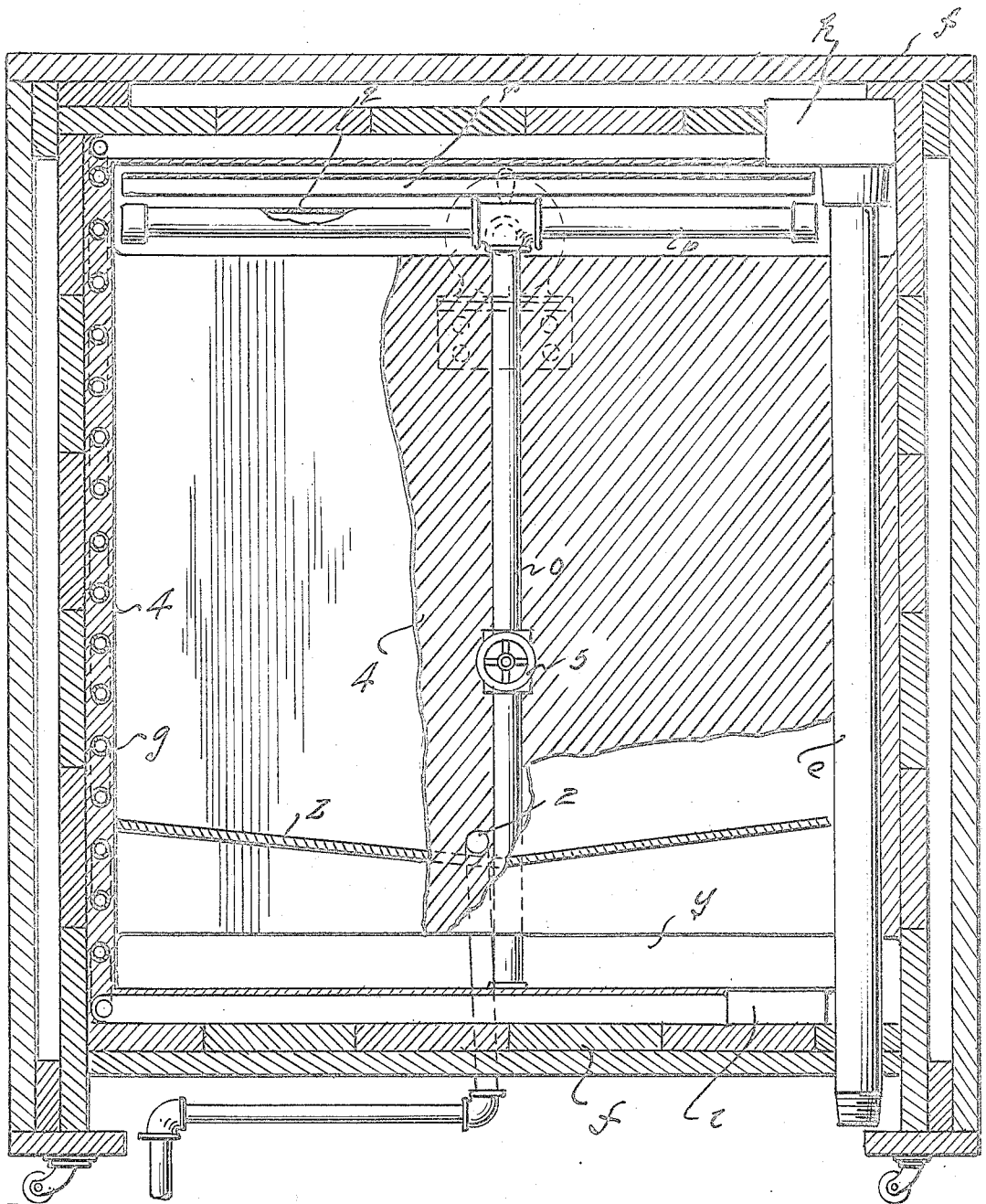

Patented Sept. 26, 1922.

1,430,153

UNITED STATES PATENT OFFICE.

LLOYD G. COPEMAN, OF FLINT, MICHIGAN, ASSIGNOR TO EDWIN W. ATWOOD, OF FLINT, MICHIGAN.

REFRIGERATING APPARATUS.

Application filed July 18, 1921. Serial No. 485,411.

*To all whom it may concern:*

Be it known that I, LLOYD G. COPEMAN, a citizen of the United States, residing at Flint, in the county of Genesee and State of Michigan, have invented certain new and useful Improvements in Refrigerating Apparatus, of which the following is a specification.

This invention relates to refrigerating apparatus, and has for its object a refrigerating apparatus in which is combined a water coil cooling system and a spray cooling system.

Water coils have been heretofore proposed for cooling the interior of a circulating box. However, on extremely hot days, such as summer weather that ranges from 90 to 100 degrees, it is practically impossible to get a temperature in a refrigerating box very closely approximating the temperature of the water itself even were the water continuously wasted in order to procure circulation through the coils.

It is the object of the present invention to utilize water coils connected up with the usual service lines in a house, store or any other place of use, and at the same time waste water drawn through these coils in the form of a spray which brings the air of the box in direct contact with the water in such a way as to cause the water to exercise its maximum capacity of absorbing heat. With the water circulated through the coils very favorable refrigerating results are secured during ordinary weather but obviously water is not presented in such a way as to utilize its maximum heat-absorbing capacity. The consequence is that the lowest feasible temperatures are not procured even with an undue wastage of water.

By employing a combined spray and coil system it is possible to utilize the coils for refrigerating with water drawn for domestic or other uses while the spray may be utilized to dispose of waste water. By utilizing a spray a very much lower temperature can be achieved. The amount of the spray can be altered to suit the temperature of the day, as will be explained hereinafter.

In the drawings,—

Fig. 3 is a vertical cross section of the same from front to back on the line 3—3 of Fig. 2.

Figure 1:
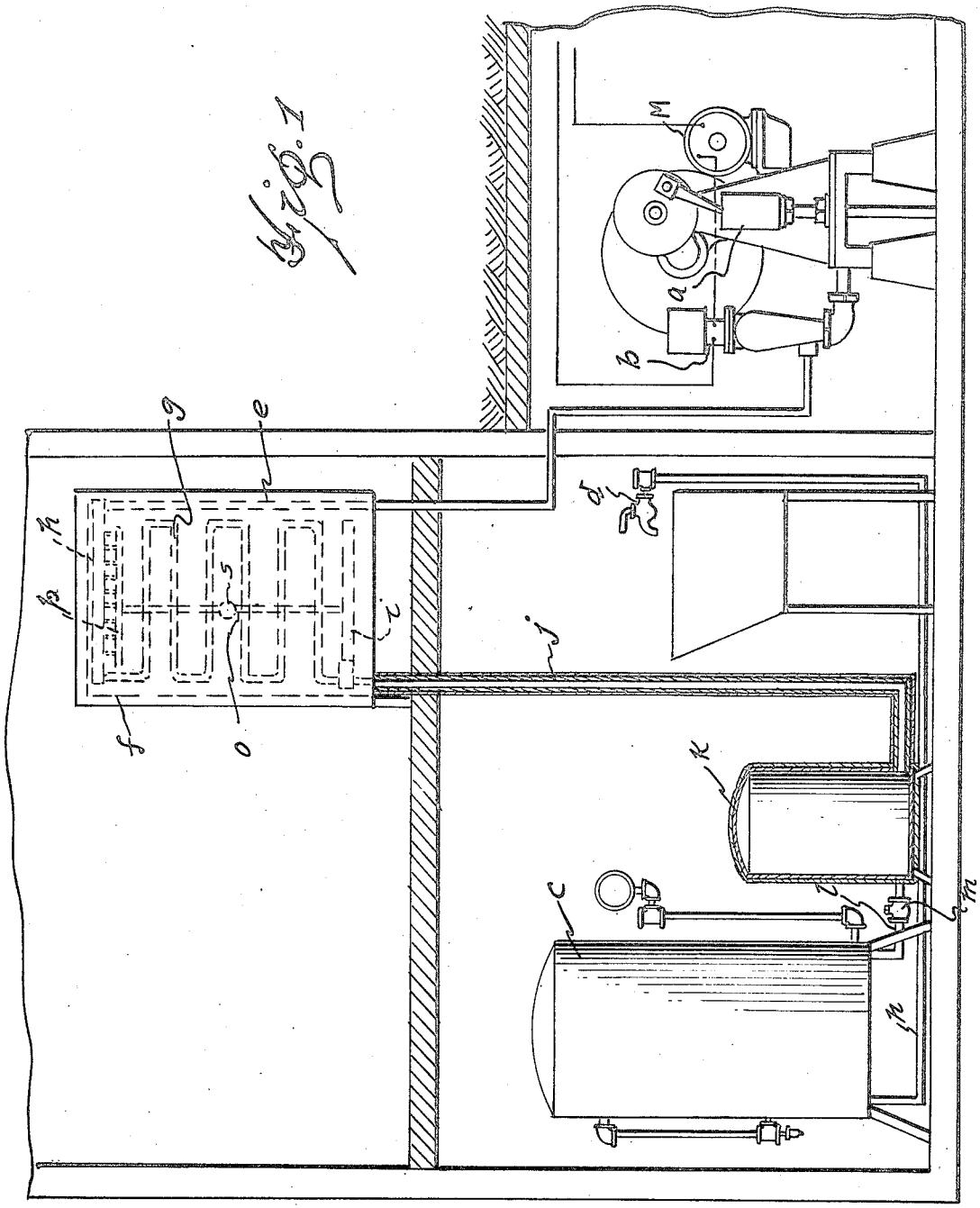
Fig. 1 is a diagrammatic view of the installation.
Figure 2:
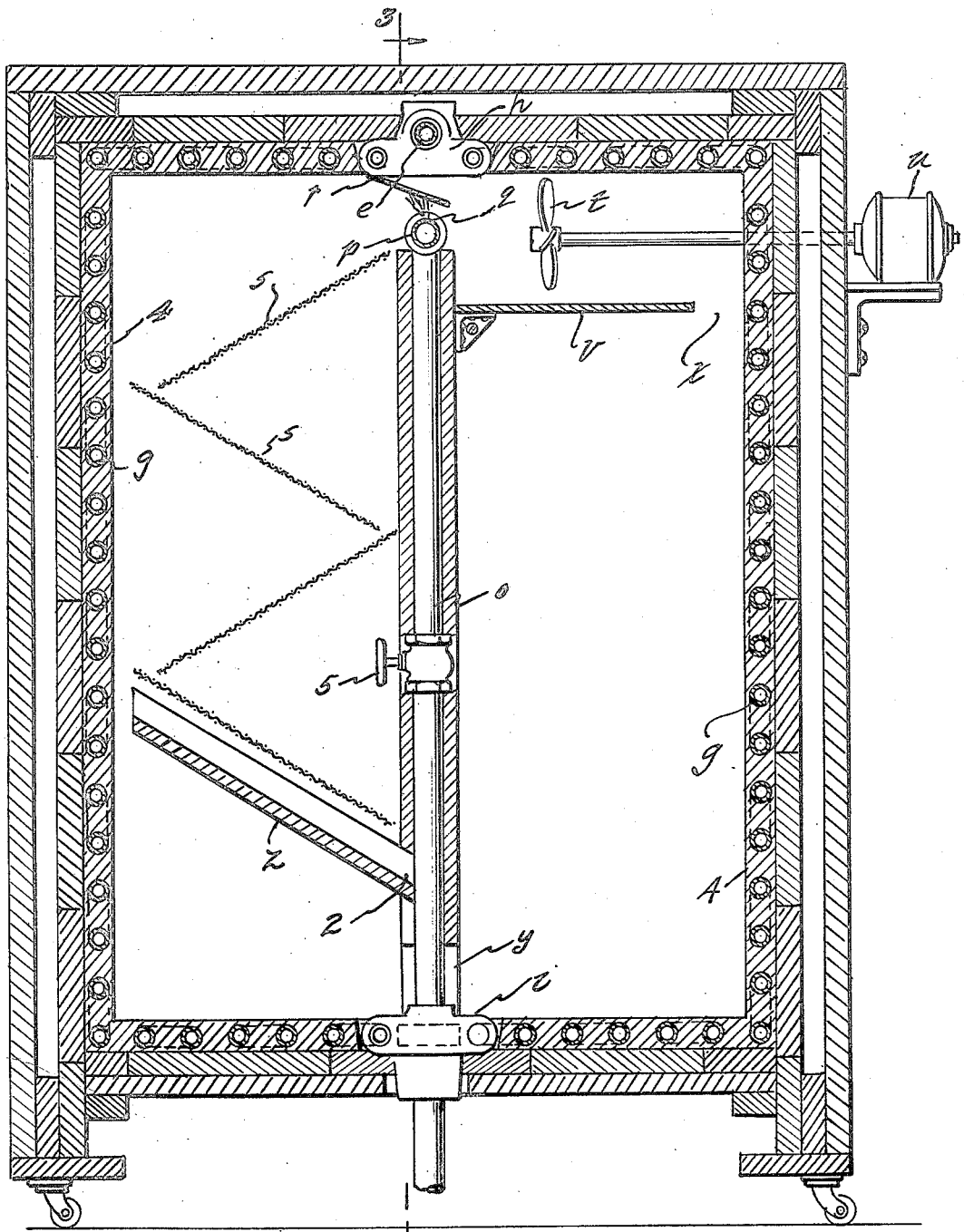
Fig. 2 is a vertical cross section of the box taken from side to side.

$a$ designates a pump operated by the motor M, which is controlled by a pressure switch $b$. This is a common form of water installation for farms. $c$ is a storage tank in which is stored a quantity of water with a head of air. When enough water is drawn out of the service lines to lower the pressure in the tank and in the pump line to a given point, the switch $b$ closes the motor circuit and starts the motor, which operates the pump to supply more water.

$d$ designates a service tap, of which there may be a great number for domestic use or for any other purpose. The water coming from the pump passes up through the supply main $e$ to the refrigerator box $f$, where it passes through the water coils $g$. The water first passes into header $h$, where it is distributed by several separate lines of coils to the bottom header $i$. From the bottom header $i$ the water passes down through the pipe $j$ to the small or auxiliary storage tank $k$. Preferably this storage tank $k$ and the pipe line $j$ are well insulated to keep the water in cold condition. The water runs through the small storage tank $k$, through the connecting pipe $l$ provided with a check valve $m$, to the storage tank $c$, and from the storage tank out through the service line $n$ to the service taps such as $d$, etc.

Leading up from the bottom header through the central partition is a waste pipe $o$ which terminates in a cross or spray pipe $p$ provided with small jet openings $q$. $r$ designates a deflector located above the jet openings which serves to deflect the jets toward the left hand or baffle screen compartment. Located in the compartment that is ordinarily used as an ice chamber in the ordinary ice refrigerator are a plurality of inclined fine mesh screens $s$. A fine spray distributed from the spray pipe $p$ drops down on these screens and part of it runs down the screen and drops onto the next screen below and some of it will drop through the screen in the form of a fine mist. These baffle screens serve to divide up the falling spray into a fine mist and at the same time allow air to pass down through the screens, coming into contact with the water liberated from the spray pipe.

Located at the top of the right hand chamber of the refrigerator is a fan $t$ driven by a motor $u$ on the outside of the box. This fan chamber is divided off from the balance of the right hand chamber by a shelf $v$, allowing the air only to approach the fan through the opening $x$. The air is drawn against the back of the fan and is propelled across the spray issuing from the spray pipe $p$ (thereby purifying it) and thence down through the baffle screens $s$ and down through the lower part of the left hand compartment through the partition opening $y$ and back up through the right hand compartment. It is not absolutely essential to use a fan to promote this circulation although better results will probably be secured with the fan than without. The water being set free from the spray pipe in very small jets, the top of the center partition forms a mist which is deflected into the left hand compartment, runs down and through the inclined baffle screens and finally upon the drain board $z$ and out the drain passage 2, and is wasted. This water being presented directly to an atmosphere of a higher temperature it is obviously in condition to absorb the maximum amount of heat units, tending to equalize the temperature of the air and the water. The presence of this water spray or mist in the left hand cooling compartment obviously creates a colder zone in the cooling compartment which will automatically start the circulation that is necessary for proper preservation of food in the same way that air circulates in an ordinary ice refrigerator due to the presence of the ice chamber.

It is possible by this spray form of wasting the water to achieve in relatively hot weather a temperature that it is impossible to achieve simply by using water coils and using the circulation induced by service use of water and the circulation induced by simply wasting water. By combining the water coils $g$, which are encased in the stone work 4, and having these connect with the ordinary service line with a system in which the water is wasted in the form of spray, it is possible to take advantage of the minimum temperature achievable by a spray form of distributing the refrigerant and at the same time minimize the waste that always attends this form of refrigerating by coupling it up with a coil system that is connected with the service line of the house or building.

In the waste line $o$ is located a valve 5 by which the amount of water allowed to go to waste in the spray is regulated. On an extremely hot day this valve may be turned to permit a maximum wastage. On a rather cool day the valve will be practically closed, and so intermediate positions may be used to suit the temperature.

The operation is as follows: The water is drawn through the supply line $e$, the coils $g$, and the pipe $j$, to the auxiliary storage tank $k$, and from there into the main storage tank $c$, through the service line $n$, to such taps as $d$, and others. The check valve $m$ prevents any of the water from the main service tank $c$ from returning into the auxiliary storage tank $k$. Air is trapped in the head of each of these storage tanks and contracted in its volume to a sufficient degree to afford the pressure necessary to distribute the water through the taps without depending upon the pump. When this pressure in the auxiliary tank has fallen below a given point then the pump is called into operation again to re-establish the maximum pressure by adding to the contents of the tank. Water is only drawn through the coils of the refrigerator when re-filling the auxiliary tank to re-establish the maximum pressure. When the maximum pressure has been established, then the pressure in the auxiliary tank $k$ causes the water to again mount through the pipe $j$, the waste pipe $o$, and out the spray. Now obviously the length of time in which the tank $k$ will again call for refilling depends altogether upon the adjustment of the valve 5 that regulates the spray and also, of course, upon how much water is drawn through the service taps. Hence by regulating the valve 5 in accordance with the temperature of the day, it is possible to do away with the thermostat to control the waste.

The auxiliary tank being of much smaller capacity than the large tank it soon becomes depleted and hence starts the motor to going much sooner than if the spray water were derived from the large tank. Frequent replenishment of the tank is desirable so as to keep the water relatively cold to use its heat-absorbing properties in the box.

What I claim is:

1. In refrigerating apparatus, the combination of a box provided with a cooling chamber, a plurality of coils for circulating water through the walls of said box and having a connection with the service line to cause circulation through said coils when water is drawn for service purposes, and means for wasting water drawn through said coils in said box through a spray delivered into said cooling chamber, substantially as described.

2. In refrigerating apparatus, the combination of a box provided with a cooling chamber, a plurality of coils for connection with a service line and located in said box for utilizing service water for cooling the walls of said box, means for wasting water drawn through said coils in said cooling chamber in the form of a spray, and means arranged for circulating the air of said box and through said spray.

3. In refrigerating apparatus, the combination of a box provided with a cooling chamber, a plurality of coils contained in the wall of said box for circulating service water throughout the box, means for wasting water drawn through said coils in the form of a spray into said cooling chamber, and means for propelling air of the box through said spray.

4. In refrigerating apparatus, the combination of a box provided with a cooling chamber, a plurality of water coils for connection with a service line for circulating service water through said box, a waste pipe for providing a spray of water drawn through said coils in said cooling chamber, and means for regulating the amount of water wasted through said spray.

5. In refrigerating apparatus, the combination of a box provided with a food chamber and with a cooling chamber, a plurality of water coils for circulating service water through the refrigerator, and regulatable means for wasting water in the form of a spray in said cooling chamber to promote air circulation through both chambers.

6. In refrigerating apparatus, the combination of a box provided with a center partition having an opening in the top and bottom, a cooling chamber located at the top and one side of said partition, a plurality of coils located in the walls of said box for circulating service water through said box, means for wasting water drawn through said coils comprising a pipe affording a spray at the top of the center partition, and means located at one side of said center partition for projecting the air of said box through the said spray into the cooling chamber.

7. In refrigerating apparatus, the combination of a box provided with a center partition having an opening at the top and bottom and arranged to form a cooling chamber at one side of the center partition, a plurality of water coils located in the walls of said box for circulating service water through said box, a spray pipe located in the opening in the top of the partition for wasting water drawn through said coils, a deflector located above said spray pipe for deflecting the spray therefrom down to the cooling chamber, and a fan located in the box at the side of the partition opposite the cooling chamber for projecting an air blast from the spray and into the cooling chamber.

In testimony whereof I affix my signature.

LLOYD G. COPEMAN.